Nov. 19, 1963  J. POUILLOUX ETAL  3,111,445
TIRE BUILDING AND SHAPING DRUM

Filed July 5, 1960  3 Sheets-Sheet 1

United States Patent Office 3,111,445
Patented Nov. 19, 1963

3,111,445
TIRE BUILDING AND SHAPING DRUM
Jacques Pouilloux, Saint-Gratien, and Jean R. Saint Paul, Paris, France, assignors to Pneumatiques et Caoutchouc Manufacture Kleber-Colombes, Paris, France, a corporation of France
Filed July 5, 1960, Ser. No. 57,862
Claims priority, application France July 3, 1959
11 Claims. (Cl. 156—416)

This invention relates to a drum for building and shaping inflatable vehicle tires and, more particularly, to a drum comprising an inflatable annular membrane extending between two coaxial circular side members or flanges which may be moved toward and away from each other.

The manufacture of inflatable vehicle tires is now commonly effected by assembling the several components into a generally cylindrical form after which this assembly, known as a band, is shaped into the characteristic toroidal configuration. When the tire construction embodies substantially inextensible circumferentially extending reinforcement between the carcass and the tread, it is necessary to effect shaping of the carcass to the generally toroidal configuration before the overhead and tread rubber are applied. Where, however, the tire is not to employ such an inextensible reinforcement between the tread and the carcass, the tread may be applied upon the carcass while the latter is in cylindrical form and the tire band thereafter shaped to the toroidal configuration. The tire building drum of this invention is adaptable for use in either mode of operation and hence can be employed to construct tires having an inextensible girdle or band between the carcass and the tread as well as tires which do not have such a feature.

Tire building and shaping machines having inflatable membranes or bladders comprising the cylindrical surface of the drum have heretofore been proposed and employed. However, these prior constructions have suffered from the defect that, when the drum is manipulated to cause the membrane to assume a toroidal form for shaping of the tire thereon, the transverse peripheral dimension of the membrane has frequently been too small with respect to the final form desired for the tire carcass so that the carcass reinforcements are not placed under sufficient tension and the carcass is not properly shaped. Moreover, in prior inflatable drum constructions, when the membrane has been made of a size such that its final toroidal configuration is proper, it has then been frequently found that the membrane or bladder is not of proper size or sufficient taut when in cylindrical configuration to serve as a satisfactory surface for assembling or building the tire carcass.

The principal object of this invention is, therefore, to provide an improved tire building and shaping drum of the inflatable annular membrane type which is so constructed and arranged that the effective transverse dimension of the membrane may be varied to have the proper dimensions both when in cylindrical configuration and in the toroidal tire-shaping position.

A more specific object of the invention is to provide an improved tire building and shaping drum as defined in the preceding paragraph wherein the inflatable membrane of the drum is inextensible in the axial direction and has means cooperating therewith to vary the free length of the membrane between the side members or flanges on which it is mounted.

A further object of the invention is to provide a tire building and shaping drum as defined above wherein the edges of the drum membrane or bladder are secured to rings which are movable with respect to the side flanges of the drum.

A still further object of the invention is to provide a tire building and shaping drum of the type described above wherein the edges of the membrane or bladder are secured to the side members or flanges of the drum with the portions intermediate the edges of the membrane passing about movable rings adapted to vary the extent of the unsupported portion of the membrane and also determine the diameter thereof when it is disposed in a cylindrical configuration.

Other objects and advantages of the invention will be apparent from the following description of the presently preferred embodiment, and certain modifications thereof, described with reference to the accompanying drawings, forming a part of this application, in which.

Figure 1:
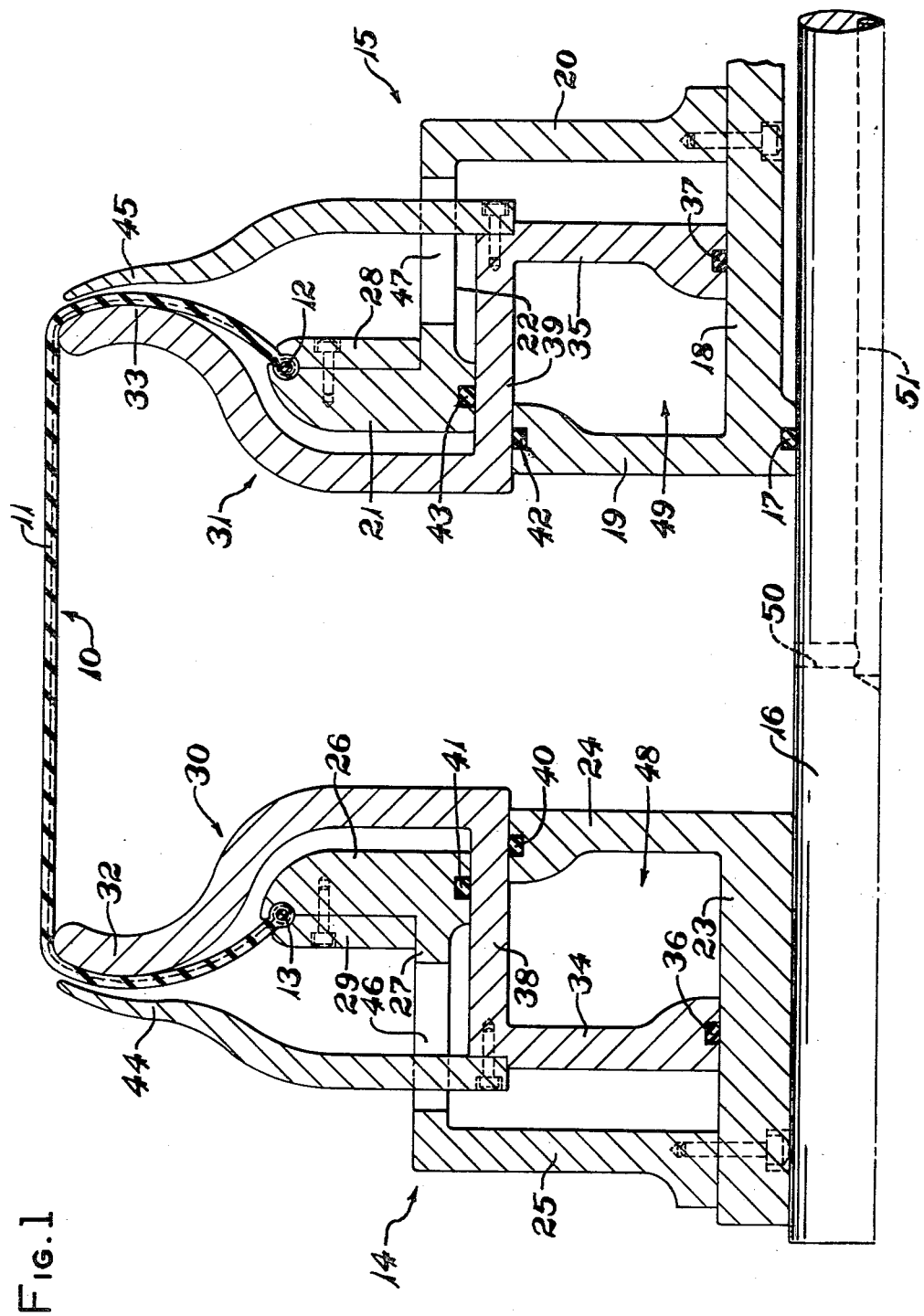
FIG. 1 is a fragmentary axial section through the presently preferred embodiment of a tire building drum constructed in accordance with this invention.

The tire building and shaping drum shown in FIG. 1, comprises a flexible membrane or bladder 10 which is an annular band of generally cylindrical configuration formed of rubber, or other suitable elastomeric material, reinforced by axially extending reinforcing elements 11, such as wire or other flexible, inextensible material. The ends of the reinforcing elements 11 are turned about bead cores 12 and 13, provided in either edge portion of the membrane or bladder, with the latter being connected to spaced side members or flanges 14 and 15 of the drum. The side members or flanges 14 and 15 are supported in spaced coaxial relationship upon a shaft 16 of a tire building machine, not shown. The side member 14 is generally similar to the member 15 but differs in that the former is connected to the shaft while the latter, although rotatable with the shaft, as by means of a key not shown, is slidable axially thereon in sealing relationship therewith, which sealing is provided by suitable means such as a sealing ring or packing 17.

The side member or flange 15 includes a sleeve portion 18 provided with an integral radial flange portion 19. The side member 15 also includes an annular part comprising integral radially extending portions 20 and 21 connected together in axially spaced relationship by an axially extending portion 22 with the radial portion 20 rigidly secured to the sleeve portion 18 and the lower side of the radial portion 21 spaced from the sleeve 18. The side member 14 likewise includes a sleeve portion 23 with radial flange 24. The side member 14 also has, attached thereto, an annular part having spaced radial portions 25 and 26 and an interconnected axial portion 27 corresponding to the like portions 20, 21 and 22 of the side member 15.

The beads or edges of the membrane or bladder 10 are held against the radial portions 21 and 26 of the side members by clamping rings 28 and 29 which are secured to the adjacent radial portions of the side members by suitable fastening means as screws or the like. The membrane or bladder 10, between its clamped edges, extends over two spaced disks 30 and 31 one each of which is provided on the side members 14 and 15, respectively. The disks 30 and 31 each have an outwardly curved radial portion 32, 33, respectively, positioned within the membrane and extending radially beyond the membrane-clamping portions of the side members to effect tensioning of the membrane as hereinafter explained.

The disks 30 and 31 also include inner radial portions 34 and 35, respectively, slidable upon the sleeve of the corresponding side member in sealing relationship therewith, the inner radial portions 34 and 35 being provided with sealing rings 36 and 37 for this purpose. Between the two radial portions of each disk is an interconnecting axial portion 38, 39, respectively, the inner and outer surfaces of which are smooth concentric cylindrical surfaces slidable in sealing relationship between radial flange portions of the side members. Thus, the upstanding radial flange 24 of the side member 14 has a cylindrical upper surface provided with a circular seal 40 cooperating with the lower cylindrical surface of the axial portion 38 of the disk 30 while the lower surface of the radial portion 26 of this member has a smooth cylindrical surface in which is disposed a sealing member or gasket 41 cooperating with the upper cylindrical surfaces of the axial portion 38 of the disk 30. The corresponding radial flanges 19 and 21 of side member 15 have similar sealing rings or gaskets 42 and 43 cooperating with the inner and outer surfaces of the axial portion 39 of disk 31.

The portion of the membrane 10 extending over the curved portions 32 and 33 of the disks 30 and 31 is protected by rings 44 and 45 which also provide a surface for receiving the bead portions of a tire when built upon the drum. The rings 44, 45 are secured to the adjacent disks 30, 31, respectively, by a plurality of legs extending through openings 46, 47 in the axial portions 27, 22, respectively, of the side members.

In employing a drum of the construction just described, the side member 15 is moved by means, not shown, relative to the side member 14 to place the membrane or bladder 10 in tensioned or taut condition. The extent of this displacement is determined by suitable switches, if the mechanism is electrically controlled, or by suitable stops, if fluid pressure or mechanically operated mechanism is used. Also at this time, fluid pressure is supplied, through passages, not shown, into the chambers 48 and 49 between the stationary radial flange portions of the side members and the movable lower radial portions 34, 35 of the disks 30, 31. Hence, the parts are positioned as shown in FIG. 1 from which it will be seen that the membrane or bladder 10 is substantially cylindrical and is maintained in taut condition by the action of disks 30 and 31. The axially extending reinforcements 11 in the membrane render the latter sufficiently rigid to withstand tire building forces but this rigidity may be augmented, if desired, by introduction of fluid under pressure to the interior of the bladder in the region between the side members through port 50 communicating with an axially extending bore 51 in the shaft 16.

When the tire being constructed upon the drum has reached the stage at which it should be shaped to the toroidal configuration, relative axial movement of the side members 14 and 15 toward each other is effected and the fluid pressure present in the chambers 48 and 49 is exhausted. Also, fluid under pressure is now admitted through the bore 51 and port 50 of the shaft so that the membrane or bladder 10 is subjected to a sufficiently elevated pressure to shape it and the tire carcass thereon to a generally toroidal configuration. During this shaping the free length of the membrane 10 will be increased due to the axial movement of the disks 30 and 31 toward each other as the result of exhaust of air pressure from the chambers 48 and 49. Preferably, this release of air pressure from the chambers 48 and 49 to effect axial movement of the disks 30 and 31 for increase of the free extent of the membrane is at a controlled rate as is also the relative movement of the side members and the application of inflation pressure to the membrane or bladder so that the tire carcass is shaped without undue stress exerted thereupon. When the tire is to be removed from th drum, fluid pressure is released from the interior of the drum allowing the bladder to collapse inwardly of the side members.

Figure 2:
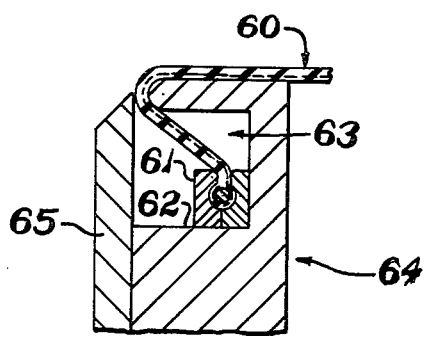
FIG. 2 is a fragmentary sectional view through one side of a modified form of tire building and shaping drum, embodying the invention, with the membrane of the drum shown in the tire building position.
Figure 3:
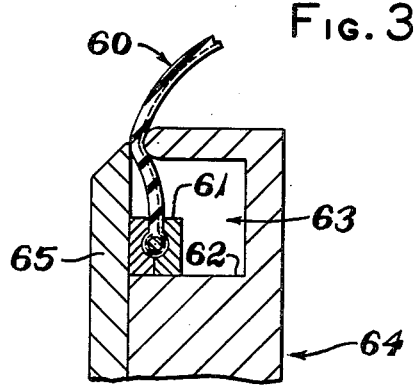
FIG. 3 is a view similar to FIG. 2 but showing the positions of the parts when the membrane or bladder has been inflated to effect shaping of a tire band.

FIGS. 2 and 3 illustrate, in somewhat schematic fragmentary form, a modification of the invention wherein the side members, one only of which is here shown, are each provided with a recess on the outer side surface in which one edge portion of an axially reinforced bladder is slidably received. It will be understood that the drum of this embodiment, like that illustrated in FIG. 1, comprises two side members supported in axially spaced relationship upon a common shaft with at least one of the members axially movable relative to the other. In this embodiment, the membrane 60 is constructed like the membrane 10 shown in FIG. 1 but has the edge or bead portions thereof clamped between two-piece rings 61 which are slidable in sealing relationship upon cylindrical surfaces 62 in axially extending recesses 63 adjacent the peripheries of the side member 64. Attached to the outer side of each of the drum side members 64 is an annular plate or cover member 65 which retains the slidable ring 61 against displacement from the side member and provides, on its outer surface, a region for reception of the bead of a tire carcass during construction. The ring 61 may be moved within the recess of the side members by any suitable means not shown as, for example, by one or more rods connected thereto and extending axially outwardly through the plate or cover member 65 for operation by mechanical or fluid pressure mechanisms.

In employing the embodiment of the invention illustrated in FIGS. 2 and 3 the side members or flanges 64 are spaced apart while the rings 61 are disposed at their axially innermost positions within the recesses of the side members, see FIG. 2. This places the membrane or bladder 60 in its cylindrical configuration to form a surface for assembly of a tire carcass upon the drum, the membrane being tensioned about the outer edges of the recesses 63. When shaping of the carcass is to be effected, the side members or flanges 64 are moved relative to each other and the rings 61 are permitted to move axially outwardly within the recesses 63 as shown in FIG. 3. This permits the membrane to increase its free length as it is shaped to the toroidal configuration by the application of fluid pressure to the interior thereof.

Figure 4:
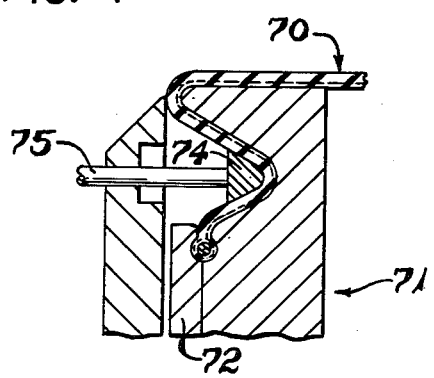
FIGS. 4 and 5 are views similar, respectively, to FIGS. 2 and 3 illustrating another modification.
Figure 5:
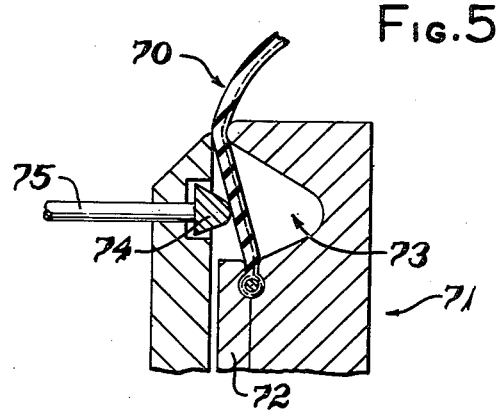

The embodiment of the invention illustrated in FIGS. 4 and 5 likewise comprises a membrane 70, constructed like the membrane 10, the edges of which are secured to a pair of side members or flanges coaxially mounted upon the shaft of a tire building drum with one side member stationary and the other movable axially as will now be understood, only a portion of one of these side members being illustrated. In this embodiment the edges of the membrane 70 are secured to the outer side surface of each of the side members 71 radially inwardly of the outer edge thereof by a suitable clamping plate 72. The outer side surface of each side member 71, intermediate the location of the clamped edge of the membrane and the outer peripheral surface of the member, has a circumferentially extending recess 73 in which a portion of the membrane may be disposed by means of a movable ring 74, as shown in FIG. 4. Each ring 74 is movable by means of a plurality of axially extending rods 75 which are preferably normally urged axially outwardly to the position shown in FIG. 5 by springs not shown.

Figure 6:
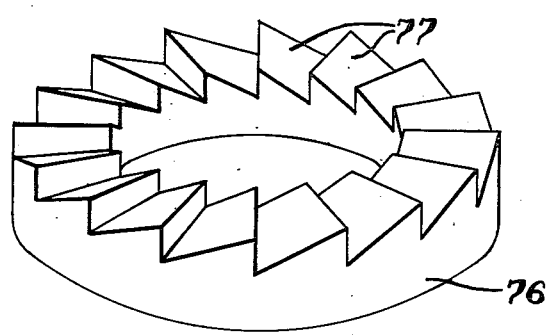
FIG. 6 is a perspective view of a cam which may be employed for operating the movable rods in the tire building drum shown in FIGS. 4 and 5.

The rods 75 may be moved inwardly to the position shown in FIG. 4 by a suitable annular cam cooperating therewith such as, for example, the cam 76 shown in FIG. 6. The cam 76 comprises a ring having a plurality of notches on one side thereof corresponding in number to the number of rods 75. Each notch on the cam 76 has an oblique face 77 for application against an end of one of the rods 75. It will be understood that cam such as 76 is mounted coaxially with the drum at each end thereof so that the inclined or oblique faces 77 engage the rods 76. Hence, a partial rotation of the cams 76 is effective to displace the rods 75 and the rings 74 so that the latter move the membrane or bladder 70 into the bottoms of the recesses 73 thus decreasing the free length of the membrane. At this time the side members 71 are spaced so that the membrane is cylindrical for tire building operations. When the tire carcass is to be shaped, the axial spacing between side members 71 is decreased and the actuating cams 76 are moved to the positions such that the rods 77 extends into the notches thereof while fluid pressure is applied to the interior of the membrane. The membrane therefore moves to the position shown in FIG. 5 with increase in the free or unsupported transverse portion thereof. It will be understood that, in place of the cam means shown in FIG. 6, fluid pressure operated means may be employed for moving the rings 74.

Figure 7:
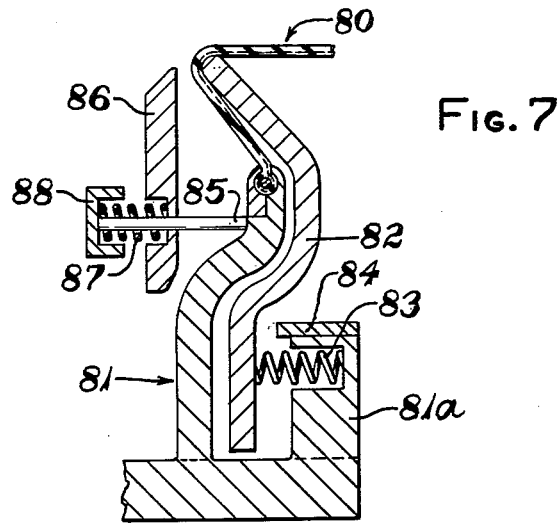
FIG. 7 is a fragmentary sectional view of one side of yet another form of tire building and shaping drum embodying the principles of this invention.

FIG. 7 illustrates a further modification of the invention wherein a membrane 80, of the type corresponding to the membrane 10, has the edges thereof sealingly secured to the outer edges of the flange or side members 81 of the drum, there being one such flange member at either side of the drum although only one is here shown. The diameter of each side member or flange 81 is less than the diameter of the tire building surface of the drum with the latter diameter being determined by a pair of movable annular plates 82 one of which is provided adjacent each of the flanges 81. These plates are urged axially outward by stiff compression springs 83 supported in axial recesses in a radial portion 81a of the side member which radial portion is disposed in axially spaced relationship to the main portion of the side member with the lower end of one of the plates 82 therebetween. Movement of the plates 82 axially away from the adjacent flange 81 against the force of the springs is limited by a stop member 84 provided on the radial portion 81a of the flange.

Each flange or side member 81 in this embodiment is provided with a plurality of axially outwardly extending rods 85 adjacent the region of connection to the flange of the edges of the membrane 80. These rods support a ring member 86 which is urged inwardly toward the flange and the adjacent portion of the membrane by springs 87 that surround the rods and act between the outer surface of the ring and a fixed cap member 88. The force of the springs 87 is less than that of the springs 83 acting upon the plates.

In employing the drum illustrated in FIG. 7, the flanges or side members 81 are gradually moved apart thus placing the membrane or bladder 80 under tension and causing a small separation of the plates 82 from the flanges against the force of the springs 83. The width of the drum does not depend upon the tension of the springs but upon the length of the inextensible membrane reinforcing elements and the distance between the flanges 81. The tire is then built upon the tensioned membrane and, when the tire is to be shaped, compressed air is admitted into the drum while the flanges are moved more closely adjacent each other. The membrane 80 is under uniform tension during the shaping and, if the tire carcass should stretch, the fluid pressure within the drum will cause the membrane to further separate the plates 82 from the flanges 81 against the force of the springs 83 thereby increasing the transverse dimension of the membrane keeping the carcass under uniform tension. The ring 86 follows movement of the membrane 80 and the flanges 81 by virtue of the force exerted by the springs 87 and hence is maintained firmly against the membrane at all times, these parts being shown in spaced relationship in the drawing for ease of understanding.

Figure 8:
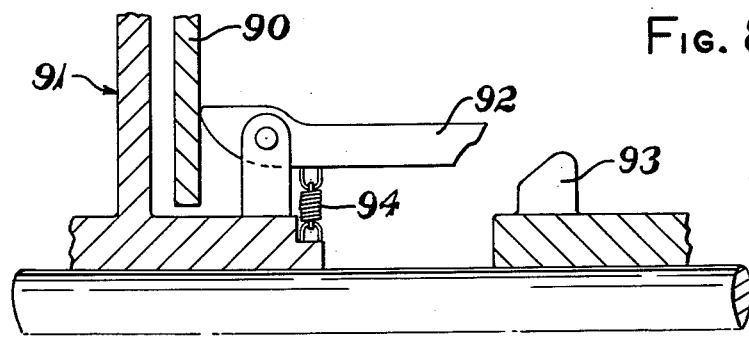
FIGS. 8 and 9 respectively show in detached fragmentary view two different positions of a still further modification of the invention.
Figure 9:
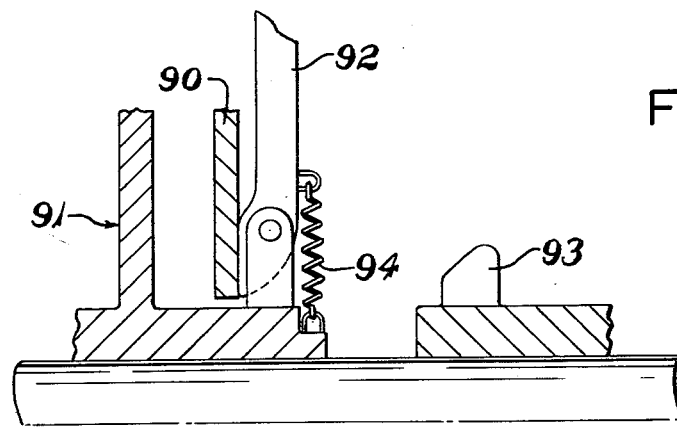

FIGS. 8 and 9 illustrate a still further embodiment wherein the building and shaping drum is provided with side flanges generally similar to those in FIG. 7 to which an axially inextensible membrane, not shown, is clamped. This embodiment, like that shown in FIG. 7, employs a movable annular plate, here designated 90, adjacent each flange 91 for cooperation with the membrane but in this instance the plates 90 are locked in the tire building position by means of levers 92 pivoted to the flanges. The forward ends of the levers 92 are provided with cam surfaces that are arcuate on the radially inner sides of the levers and substantially planar on the radially outer sides. Each flange or side member 91 carries one or more cam members 93 thereon adapted to cooperate with the axially inner ends of the levers 92 on the opposite flange member.

In this construction the parts occupy the relative positions shown in FIG. 8 when the membrane is stretched taut and the drum is in tire building condition. When the tire is to be shaped, the drum flanges 91 move relatively toward each other whereupon the cams 93 engage the levers 92 and rock the latter against the force of retracting springs 94 thus releasing the plates 90 from their blocked positions shown in FIG. 8. Hence, fluid under pressure applied to the interior of the drum acts upon the membrane to cause these plates 90 to move away from the flanges and to the position shown in FIG. 9 with the levers taking up the positions illustrated therein. When the pressure in the building drum is relieved, the membrane slackens and the return springs 94 rock the levers 92 back to the position shown in FIG. 8 to thus again block the plates 90 against axial inward movement.

It will be apparent that this invention provides a tire building and shaping drum which is especially advantageous for the manufacture of tires in a two-step process. It is also, however, useful in the building of tires wherein the entire carcass and tread are assembled in one stage before shaping occurs. It will also be apparent that, although a number of embodiments have been described, these are not exhaustive of the forms in which the invention may be incorporated since changes and adaptations thereof may be made by those skilled in the art without departing from the principles of the invention which are defined in the appended claims.

Having thus described the invention, we claim:

1. A tire building and shaping drum comprising a pair of axially spaced air-impervious side members, means supporting said side members coaxially for relative axial movement, and annular flexible air-impervious membrane inextensible in an axial direction, clamp means on each side member securing the edges of said membrane to the said side members with an unsupported portion of the membrane between the side members to provide therewith an enclosed air chamber having a passage thereinto for air under pressure, the said membrane and said members in one position thereof disposing said membrane in a substantially cylindrical configuration and movable therefrom to another position to dispose the said membrane in a substantially toroidal configuration when air under pressure is introduced into said chamber, and means to increase the extent of the unsupported portion of said membrane as it moves from its substantially cylindrical to its substantially toroidal configuration including an annular part on each of said side members provided with a surface engaging said membrane in a circular region spaced radially outwardly from the adjacent clamp means and axially deflecting the engaged portion of said membrane, and means for effecting relative axial movement between each of said annular parts and the adjacent clamp means to thereby shift radially toward said clamp means the locations of the regions of engagement of the said annular parts with the membrane when the side members are moved to dispose the membrane in its substantially toroidal configuration.

2. A tire building and shaping drum as defined in claim 1 wherein the said side members of the drum each have an axially extending annular recess adjacent the outer periphery, each of said clamp means is located in one of said recesses and is axially slidable therein, and the said surface on each side member engaging the membrane is provided on the radially outer wall of said recess.

3. A tire building and shaping drum as defined in claim 1 wherein the said clamp means are provided on the outer side surfaces of said side members radially inwardly of the peripheries thereof and each of said side members has an annular recess in its outer side face intermediate its periphery and the said clamp means thereon with the portions of the membrane radially outwardly of said clamp means extending over said recesses, the said annular part is a ring member movably supported on each side member in alignment with the said recess in that side member and axially outwardly of said membrane, and means to move each ring member axially inwardly to deflect a portion of the membrane into the aligned recess.

4. A tire building and shaping drum as defined in claim 1 and further comprising a cover member carried by each of said side members and extending over the region of attachment of the membrane to said clamp means, the outer peripheries of said cover members each having a diameter approximating the diameter of the membrane when the latter is in its cylindrical configuration.

5. A tire building and shaping drum comprising a pair of axially spaced air-impervious side members with circular peripheries, means supporting said side members coaxially for relative axial movement, an annular flexible air-impervious membrane inextensible in an axial direction, clamp means on each side member securing the edges of said membrane to said sire members with an unsupported portion of the membrane between the side members to provide therewith an enclosed air chamber which has a passage thereinto for air under pressure, the said membrane and said members in one position thereof disposing said membrane in a substantially cylindrical configuration and movable therefrom to dispose the said membrane in a substantially toroidal configuration when air under pressure is introduced into said chamber, and means to increase the extent of the unsupported portion of said membrane as it moves from its substantially cylindrical to its substantially toroidal configuration including a separate annular member mounted on each of said side members radially and axially inwardly of said membrane for movement with its side member and limited movement relative thereto in an axial direction, the said annular members each having a circular surface of greater diameter than that of the said side members and engageable with the membrane on the interior thereof radially outwardly of the portion of the latter secured to the adjacent side member, and means exerting an axially outwardly directed force on said annular members to thereby deflect said membrane axially outwardly adjacent said clamp means when the said side members are in the position which disposes said membrane in its cylindrical position, the last-mentioned means yielding to permit movement of said annular members axially inwardly relative to the respective adjacent side members when air under pressure is introduced into said chamber and the said side members are moved to dispose the membrane in its toroidal configuration.

6. A tire building and shaping drum as defined in claim 5 wherein the last-named means comprise springs between each side member and the said annular member mounted thereon.

7. A tire building and shaping drum as defined in claim 5 wherein the last-named means comprise pivoted latch means on each of said side members engaging the said annular member mounted thereon, the said latch means being movable between a first position in which the said annular members are held adjacent said clamp means and a second position in which the said annular members are axially spaced a greater distance from the said clamp means.

8. A tire building and shaping drum comprising a pair of side members, means supporting said side members coaxially for relative axial movement, an annular flexible air-impervious membrane inextensible in an axial direction, means securing the edges of said membrane to said side members, a disk-like member mounted on each of said side members for limited axial movement relative thereto, said disk-like members each having a circumferentially extending surface engaging the interior of said membrane radially outwardly of its connection to said side members to deflect the membrane relative to said side members, and means cooperating with said disk-like members to effect movement of the latter to and from positions in which the said membrane is disposed in a generally cylindrical configuration by engagement of the said disk-like members therewith or is permitted to take a generally toroidal configuration.

9. A tire building and shaping drum comprising a pair of side members, a common shaft supporting said side members coaxially for relative axial movement, an annular flexible air-impervious membrane inextensible in an axial direction, means securing the edges of said membrane to said side members, a disk-like member slidably mounted on each of said side members for limited axial movement relative thereto, said disk-like members each having a circumferentially extending surface engaging the interior of said membrane radially outwardly of its connection to said side members to deflect the membrane relative to said side members, the said shaft having passages therein for supplying air under pressure to the interior of the drum, and means cooperating with said disk-like members to effect movement of the latter to and from positions in which the said membrane is disposed in a generally cylindrical configuration by engagement of the said disk-like members therewith or is permitted to take a generally toroidal configuration under influence of air under pressure within the drum.

10. A tire building and shaping drum comprising a pair of side members, means supporting said side members coaxially for relative axial movement, an annular flexible air-impervious membrane inextensible in an axial direction, means securing the edges of said membrane to said side members, a disk-like member mounted for limited axial sliding movement on each of said side members, said disk-like members each having a circumferentially extending arcuate surface engaging the interior of said membrane radially outwardly of its connection to said side members to deflect the membrane relative to said side members, said disk-like members each including a portion extending in air sealing relationship with portions of the adjacent side member on which it is mounted to constitute fluid pressure actuated means for movement of said disk-like members to and from positions in which the said membrane is disposed in a generally cylindrical configuration by engagement of the said disk-like members therewith when said side members are spaced apart the maximum permissible distance or is permitted to take a generally toroidal configuration when said side members are axially spaced less than the said maximum distance.

11. A tire building and shaping drum as defined in claim 10 and further comprising a cover member secured to each of said disk-like members and extending exteriorly over the region of attachment of the membrane to the adjacent side member.

References Cited in the file of this patent

UNITED STATES PATENTS

| | | |
|---|---|---|
| 1,789,143 | Kraft | Jan. 13, 1931 |
| 2,814,330 | Vanzo | Nov. 26, 1957 |
| 2,935,117 | Pfeiffer | May 3, 1960 |

FOREIGN PATENTS

| | | |
|---|---|---|
| 432,412 | Great Britain | July 25, 1935 |
| 825,806 | Great Britain | Dec. 23, 1959 |